United States Patent [19]

Okui et al.

[11] Patent Number: 5,024,287

[45] Date of Patent: Jun. 18, 1991

[54] ENGINE UNIT FOR VEHICLE

[75] Inventors: Kaoru Okui; Manabu Kobayashi, both of Iwata, Japan

[73] Assignee: Yamaha Hatsudiki Kabushiki Kaisha, Iwata, Japan

[21] Appl. No.: 270,357

[22] Filed: Nov. 14, 1988

[30] Foreign Application Priority Data

| | | | |
|---|---|---|---|
| Mar. 31, 1987 | [JP] | Japan | 63-78535 |
| Dec. 1, 1987 | [JP] | Japan | 62-301542 |
| Dec. 1, 1987 | [JP] | Japan | 62-301543 |

[51] Int. Cl.$^5$ .......................................... F16H 57/02
[52] U.S. Cl. ...................... 180/297; 74/15.8; 74/606 R; 123/195 AC; 180/68.3
[58] Field of Search ............. 180/297, 292, 291, 68.3; 123/195 AC, 195 A; 74/15.8, 15.82, 15.84, 421 A, 606 R

[56] References Cited

U.S. PATENT DOCUMENTS

| | | | |
|---|---|---|---|
| 3,703,107 | 11/1972 | Piret | 74/606 R |
| 4,223,567 | 9/1980 | Onda | 123/195 A |
| 4,395,980 | 8/1983 | Tominaga et al. | 123/195 A |
| 4,798,254 | 1/1989 | Lings | 180/297 |

FOREIGN PATENT DOCUMENTS

| | | | |
|---|---|---|---|
| 698056 | 11/1964 | Canada | 180/297 |
| 3210926 | 10/1983 | Fed. Rep. of Germany | 180/297 |
| 289694 | 8/1973 | U.S.S.R. | 123/195 AC |
| 976014 | 11/1964 | United Kingdom | 180/297 |

Primary Examiner—David M. Mitchell
Attorney, Agent, or Firm—Ernest A. Beutler

[57] ABSTRACT

Several embodiments of power units particularly adapted for transverse engine operation for driving the wheels of a motor vehicle. In all of the embodiments, the axles are disposed on one side of the engine and a change speed transmission is located on the other side of the engine. The change speed transmission is driven from a gearing arrangement located between the ends of the crankshaft and in some embodiments torsional vibration dampers are included in the drive for the change speed transmission. Vibration dampers are affixed to one or both ends of the crankshaft in some embodiments and an auxiliary shaft is driven from the transmission primary shaft for operating the camshafts of the engine.

40 Claims, 7 Drawing Sheets

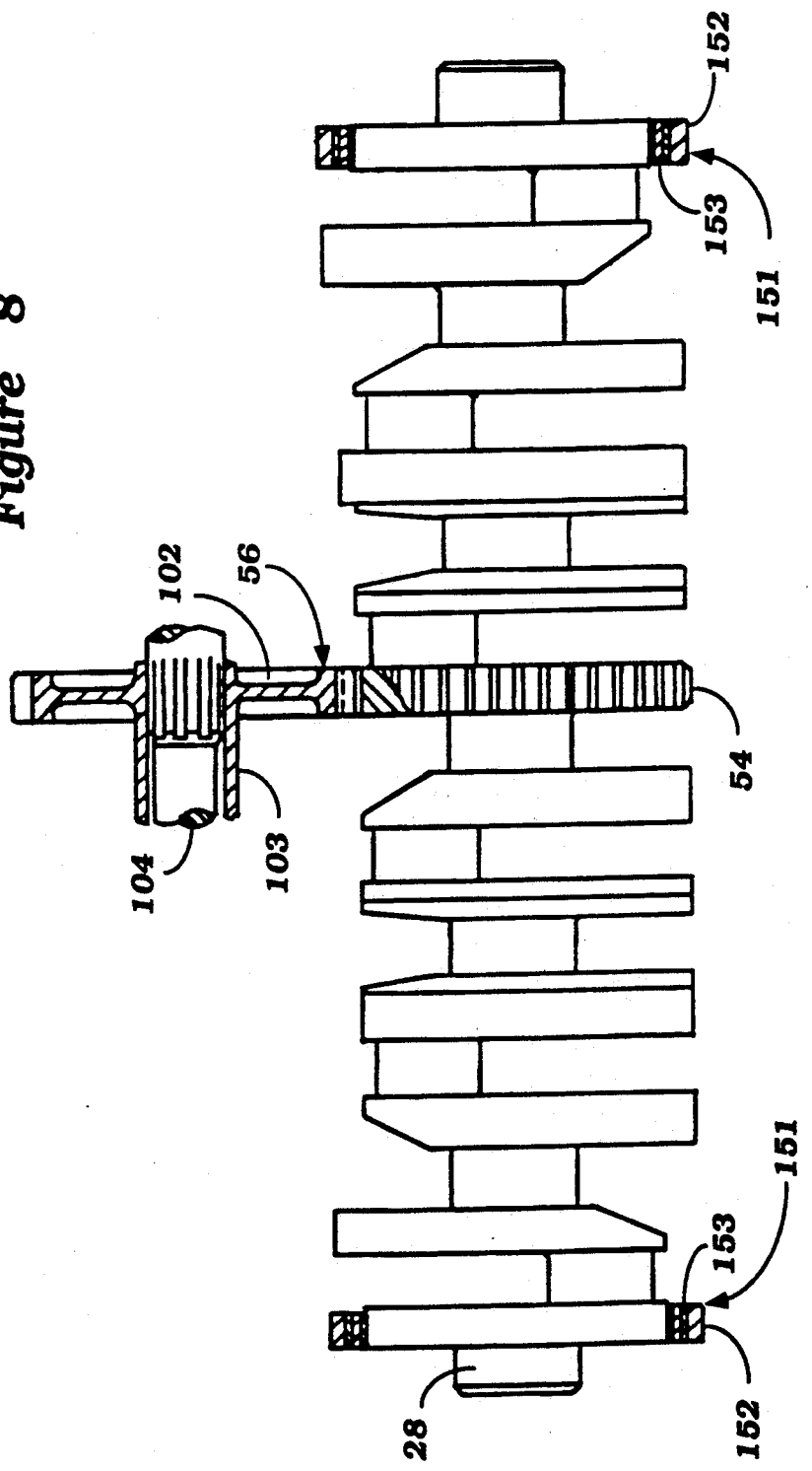

ENGINE UNIT FOR VEHICLE

BACKGROUND OF THE INVENTION

This invention relates to an improved engine unit for a vehicle and more particularly to an improved compact internal combustion engine, transmission and final drive assembly for a vehicle.

The difficulty in providing a compact yet serviceable drive arrangement for a motor vehicle is well known. These problems are particularly acute in conjunction with front wheel drive vehicles, although similar problems are present in rear engine, rear wheel drive vehicles. In order to minimize some of the spatial problems and offset some of the deficiencies in that type of vehicle, it has been proposed to mount the powering engine in a transverse relationship so that its output shaft rotates about an axis that extends transversely to the vehicle. Such arrangements are very popular due to the degree of compaction which they afford without significantly adversely effecting serviceability.

However, it is the normal practice to put the transmission and final drive together on one side of the engine. This means that the engine must assume a relatively upright position in order to accommodate these driving components. Such an upright arrangement can give rise to sacrifices in the configuration of the body of the vehicle. For example, in a front engine, front wheel drive arrangement, such a placement causes the engine to be put in either a vertical or a forwardly inclined position. As such, the height of the engine is relatively high at the front of the vehicle and streamlined hood shapes are not possible. Similar problems also occur at the rear end of the vehicle in connection with rear engine, rear wheel drive applications. In addition to the difficulties in providing the desired configuration for the vehicle body structure, the location of the induction and exhaust systems in such applications becomes quite difficult.

It is, therefore, a principal object of this invention to provide an improved layout for the engine transmission final drive of a motor vehicle.

It is a further object of this invention to provide an improved transverse engine, transmission, final drive layout for a motor vehicle.

It is a yet further object of this invention to provide an improved, compact and relatively low engine drive arrangement for a front wheel drive vehicle.

In connection with the use of transverse engines, it has been previously noted that it is the frequent practice to position the transmission and final drive at one side of the engine. As has been noted, this tends to cause the engine to be more upright than might otherwise be desirable. In addition, the positioning of both the transmission and final drive at one side of the engine can compromise the position of the engine relative to the driven axle. Where, however, the engine is positioned centrally and the transmission is on one side and the final drive is on the other side, an arrangement may result that provides too great an overall length (when the engine is considered transversely) or width (when the engine is considered longitudinally).

It is, therefore, a still further object of this invention to provide an improved compact engine transmission, final drive for a motor vehicle.

It is a yet further object of this invention to provide an improved compact power unit for a motor unit for a motor vehicle wherein the engine is positioned centrally with the transmission on one side and the final drive on the opposite side.

In addition to providing a compact arrangement in the fore and aft direction in connection with the use of transverse engines, it is also desirable to maintain the overall length of the engine as short as possible. Of course, this holds true with both fore and aft and transverse engines. One way in which the length of an engine can be reduced is by driving an auxiliary shaft from the crankshaft and taking the final drive and camshaft drive off of this auxiliary shaft. In this arrangement, the camshaft drive can be located inwardly from the ends of the engine and will not unduly lengthen the engine. However, where both the final drive and the camshaft drive are taken off of the same auxiliary shaft, certain problems are encountered. For example, there is some desirability in providing a torsional damper in the output shaft of the engine. However, the camshaft drive cannot be driven through such a torsional damper because the cam timing events will vary during engine revolution.

It is, therefore, a yet further object of this invention to provide an improved and compact drive arrangement wherein both the camshaft and output are taken off of an auxiliary shaft and wherein a vibration damper is provided in only one of the outputs.

It is a further object of this invention to provide an improved camshaft and final drive from an auxiliary shaft of an engine wherein the final drive has a torsional damper but the camshaft drive does not.

In conjunction with engine design, it is normally the practice to employ a torsional vibration damper at one end of the engine. Normally this torsional vibration damper is driven from the crankshaft at the end opposite that at which the flywheel is driven. Such an arrangement, of course, lengthens the crankshaft and, accordingly, the overall engine.

It is, therefore, a still further object of this invention to provide an improved arrangement for providing a torsional vibration damper for a crankshaft without lengthening the overall engine construction.

It is a further object of this invention to provide an improved drive arrangement for an engine wherein the use of a torsional damper does not add significantly to the length of the engine.

As has been previously noted, one way in which the overall length of an engine can be reduced is by driving the camshaft from an auxiliary shaft that is driven from the engine crankshaft at a point between its ends. However, if a separate gear is affixed to the crankshaft for driving the timing chain drive shaft, the full advantages of shortening of the crankshaft cannot be achieved.

Therefore, it is yet a further object of this invention to provide an improved and compact power takeoff arrangement for the crankshaft of an internal combustion engine that facilitates shortening of its length without sacrificing its functions.

As has been noted, in connection with the provision of transverse engines for front wheel drive vehicles, it is important to insure that the engine is located and oriented in such a way that a relatively low hood line will result. It is, therefore, a still further object of this invention to provide an improved engine orientation for a transverse engine, front wheel drive vehicle wherein the engine cylinders are inclined in such a way as to provide a low hood line.

It is a further object of this invention to provide a rearwardly inclined, transverse engine for a front wheel drive vehicle.

In the event an engine of a transverse disposition is formed with rearwardly inclined cylinder bores, the cylinder block casting can have a configuration which is difficult to form. That is, it is the normal practice to have the lower end of the cylinder block in mating relationship with the upper end of the crankcase. If a horizontally disposed upper crankcase surface is employed, this means that the cylinder block lower surface must be similarly oriented, which can present problems in connection with the use of rearwardly inclined cylinders.

It is, therefore, a still further object of this invention to provide an improved cylinder block crankcase arrangement wherein the cylinder block has inclined cylinder bores and the cylinder block and crankcase have mating surfaces.

In connection with engines having inclined cylinder blocks, there is also the problem of location and placement of the manifolding for the engine. If the engine is inclined rearwardly, it is desirable to place the intake manifold on the forward side of the engine for serviceability and other reasons. However, when the intake manifold is located forwardly, the manifold and associated components can, themselves, further encroach upon the hood line of the vehicle.

It is, therefore, a still further object of this invention to provide an improved arrangement and configuration for the intake manifold and induction system of a transverse engine having rearwardly inclined cylinders.

SUMMARY OF THE INVENTION

A first feature of this invention is adapted to be embodied in a motor vehicle having a driven wheel that rotates about a first axis that extends generally transversely to the vehicle. An engine is supported within the vehicle with its output shaft rotating about a second axis that extends generally parallel to the first axis and which is disposed on one side thereof. In accordance with this feature of the invention, a transmission having a primary shaft rotatable about a third axis generally parallel to the first axis is also provided. Means drive the transmission primary shaft from the engine output shaft, and means including the transmission drive the wheel from the primary transmission shaft.

Another feature of the invention is adapted to be embodied in an internal combustion engine transmission assembly which comprises an output shaft powered by the engine and rotating about a first axis. A transmission primary shaft is rotatable about a second axis parallel to the first axis and offset therefrom a first distance. A transmission secondary shaft is rotatable about a third axis parallel to the first axis and offset therefrom a second distance. Means drive the primary shaft from the engine output shaft and means including change speed gearing drives the transmission secondary shaft from the transmission primary shaft at selected speed ratios. In accordance with this feature of the invention, the second distance is less that the first distance.

Another feature of this invention is adapted to be embodied in an internal combustion engine that comprises a crankshaft driven by the engine and rotatable about a first axis. A power takeoff shaft is also provided. An auxiliary shaft is rotatable about a second axis offset from the first axis for operating a component of the engine. A transfer shaft is rotatable about a third axis. Means are provided for driving the transfer shaft directly from the crankshaft and means directly drive the auxiliary shaft from the transfer shaft. In accordance with this feature of the invention, torsionally resilient means drive the power takeoff shaft from the transfer shaft.

Another feature of this invention is adapted to be embodied in an internal combustion engine that comprises a crankshaft driven by the engine and rotating about an axis. An output shaft is rotatable about an axis parallel to an offset from the crankshaft axis. Drive means intermediate the ends of the crankshaft drive the output shaft from the crankshaft. A flywheel is fixed for rotation with one end of the output shaft. In accordance with this feature of the invention, a torsional vibration damper is affixed directly to one end of the crankshaft.

Yet another feature of this invention is adapted to be embodied in a crankshaft driven by an engine and having a plurality of throws defined by facing pairs of cheeks. At least one of the cheeks is formed as a generally cylindrical surface and carries external gears thereon. An auxiliary shaft having a gear fixed thereon and enmeshed with the gear carried by the crankshaft drives the auxiliary shaft from the crankshaft.

Still another feature of the invention is adapted to be embodied in a motor vehicle that has an engine compartment and an engine disposed in the engine compartment and having a cylinder block that extends transversely across the engine compartment. The cylinder block is formed with a plurality of aligned cylinders and drives a crankshaft that is rotatable about an axis extending transversely to the engine compartment. In accordance with this feature of the invention, the cylinders are inclined rearwardly from a vertically extending plane so that the crankshaft axis is disposed forwardly of the cylinders.

Still another feature of the invention is also adapted to be embodied in a motor vehicle that has an engine compartment and an engine having a cylinder block which is disposed transversely within the engine compartment and which drives a crankshaft that is rotatable about an axis and that extends transversely to the engine compartment. The crankshaft is supported within a crankcase formed by a lower portion of the cylinder block and an upper portion of a crankcase pan. In accordance with this feature of the invention, the cylinder block is inclined from the vertical and the mating faces between the cylinder block and crankcase pan lie in a plane that extends substantially perpendicular to the axis of the cylinders.

A further feature of the invention is also adapted to be embodied in a motor vehicle that has an engine compartment and an engine having a cylinder block that is disposed transversely within the engine compartment and which drives a crankshaft. In accordance with this feature of the invention, the cylinder block is inclined rearwardly from a vertically extending plane and has generally forwardly facing intake ports. An intake manifold extends forwardly from the intake ports and is affixed to the cylinder block. The intake manifold is curved downwardly and lies at least in part above the cylinder block and has an inlet end positioned forwardly thereof.

BRIEF DESCRIPTION OF THE DRAWINGS

FIG. 8 is a partial cross-sectional view, in part similar to FIG. 7, showing yet another embodiment of the invention.

DETAILED DESCRIPTION OF THE PREFERRED EMBODIMENTS OF THE INVENTION

Figure 1:
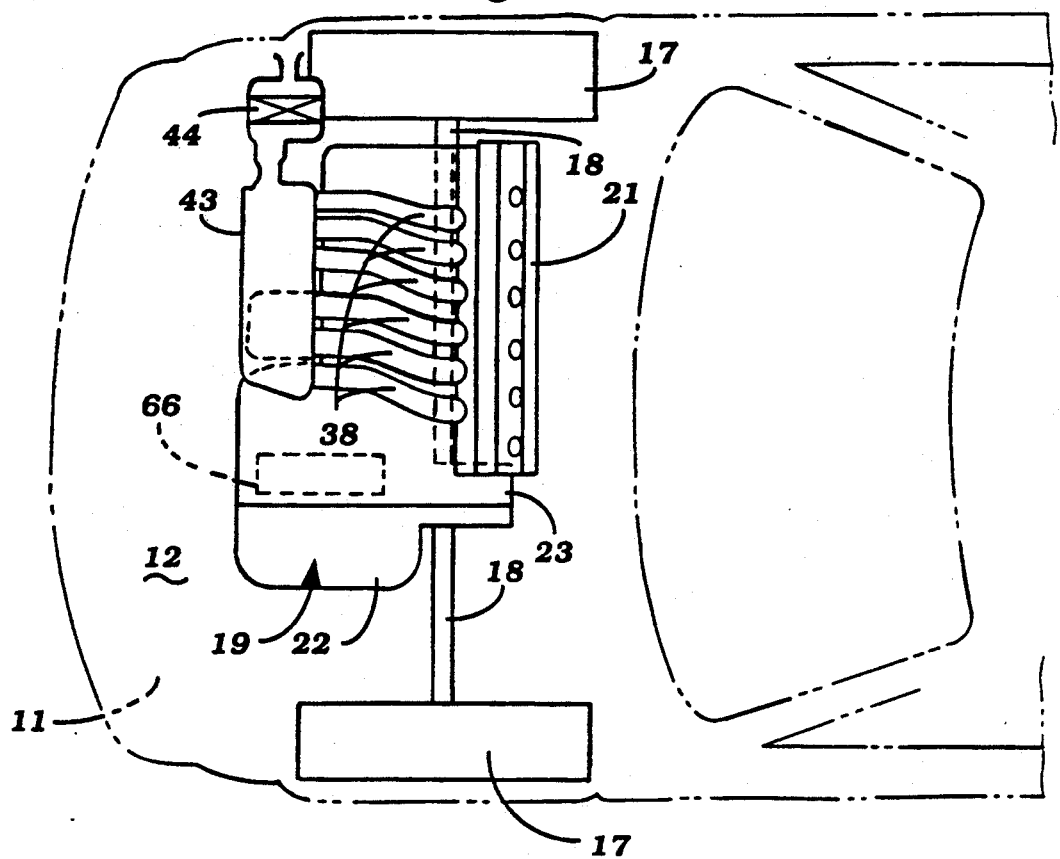
FIG. 1 is a top plan view of a motor vehicle, shown in phantom, embodying an engine, transmission, final drive constructed in accordance with an embodiment of the invention.
Figure 2:
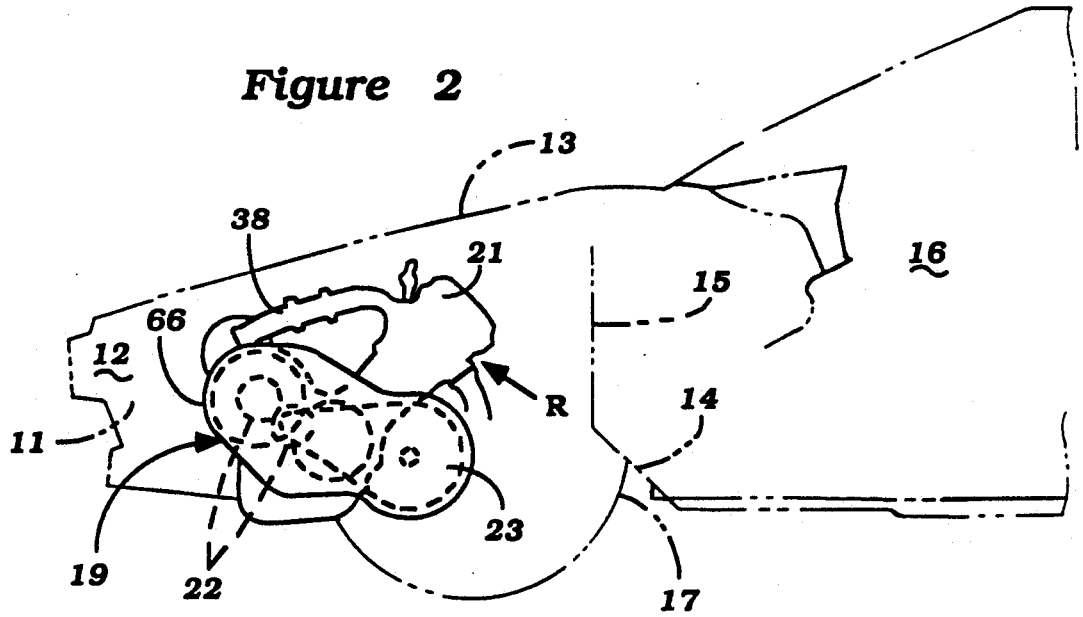
FIG. 2 is a side elevational view of the motor vehicle.

Referring first to FIGS. 1 and 2, a motor vehicle constructed in accordance with a first embodiment of the invention is identified generally by the reference numeral 11. The motor vehicle 11 is depicted as being of the front engine, front wheel drive type and is adapted to carry one or more passengers. Although the invention is described in conjunction with such front engine, front wheel drive type vehicles, it is to be understood that the invention or at least certain facets of it have application with other types of motor vehicles or to engines per se.

The motor vehicle 11 is provided with a forwardly positioned engine compartment 12 that is defined in part by a downwardly sloping hood 13 of generally streamlined configuration. A toe board 14 and fire wall 15 separate the engine compartment 12 from a passenger's compartment 16 which may have any configuration. Inasmuch as the vehicle per se does not form a part of the invention, except insofar as its relationship the engine compartment 12 and the components contained therein, further discussion of the vehicle 11 is not believed to be required. Furthermore, for this reason, the vehicle 11 has been shown primarily in phantom.

The invention relates primarily to an arrangement for driving a pair of front wheels 17 of the vehicle 16. The front wheels 17 have associated with them axle shafts 18 by which the wheels are driven about axes of rotation that extend generally transverse to the vehicle 11. Of course, the front wheels 17 are supported for both suspension travel in a vertical direction and steering movement about generally vertically extending steering axes. To this end, the axle shafts 18 are connected to the front wheels 17 by means of homokinetic universal joints of any known type. The axle shafts 18 are powered by means of a power unit, indicated generally by the reference numeral 19 and which is comprised of an internal combustion engine 21, of a type to be described, a transmission 22 that is powered by the engine 21 and which drives the axle shafts 18 through a differential 23.

Figure 3:
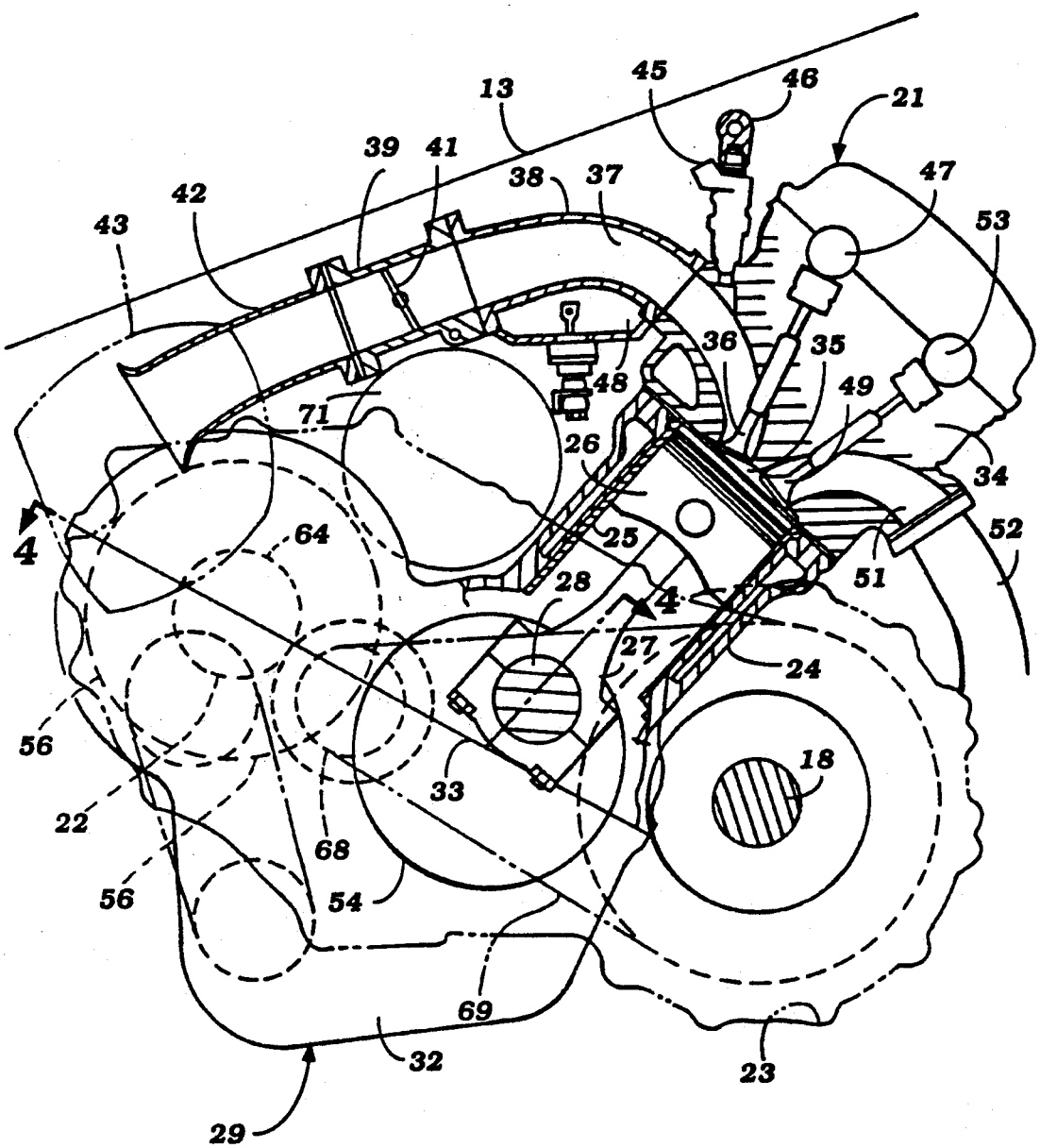
FIG. 3 is an enlarged side elevational view, with portions broken away and shown in section of the power unit for the vehicle.
Figure 4:
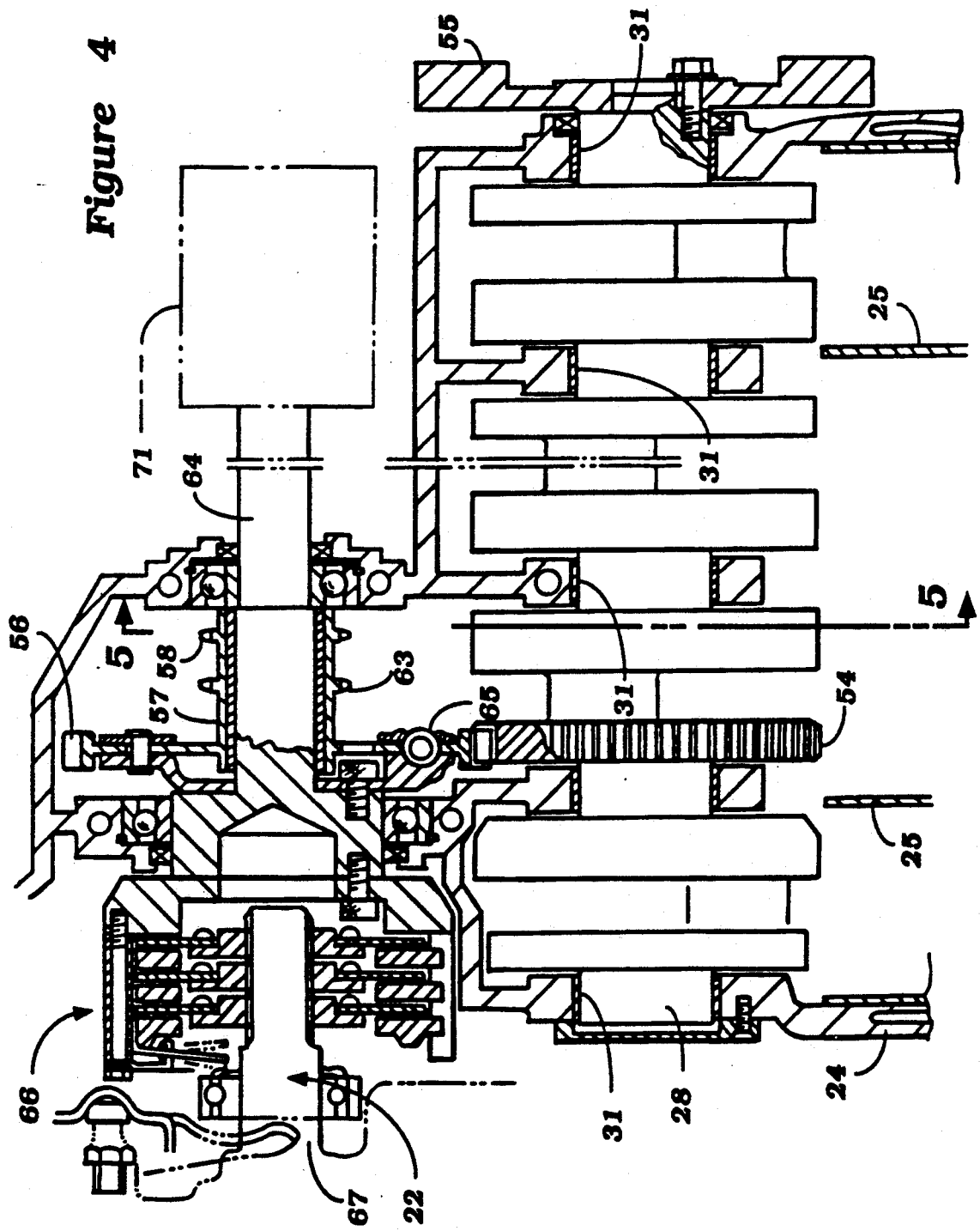
FIG. 4 is an enlarged cross-sectional view taken along the line 4—4 of FIG. 3.

Referring now additionally and primarily to FIGS. 3 and 4, the engine 21 may be of any known type. In the illustrated embodiment, the engine 21 is depicted as being of the in-line, six cylinder, four cycle type. It is to h=understood, however, that the invention may be utilized in conjunction with engines having other cylinder numbers or other cylinder configurations. Also, certain facets of the invention may h=employed in conjunction with engines other than those of those of the reciprocating type. However, the invention has particular utility in in-line type of engines.

The engine 21 is comprised of a cylinder block 24 which may be formed of a light weight material such as cast aluminum alloy and which has cylinder liners 25 that define cylinder bores in which pistons 26 reciprocate. The cylinder bore axes define a plane that is inclined rearwardly from the vertical. As such the cylinder block 24 overlies the axles 18. The pistons 26 are connected by means of connecting rods 27 to a crankshaft 28 that is journaled within a crankcase 29 of the engine 21 in a known manner, as by means of spaced main bearings 31.

The crankcase 29 is defined by the lower end of the cylinder block 24 and a lower pan 32 that is joined to the cylinder block 24 in a suitable manner along an upwardly and forwardly inclined parting line 33. The parting line 33 defines a plane that is perpendicular to the plane defined by the cylinder bore axes.

A cylinder head 34 is affixed to the cylinder block 24 in a known manner and has individual recesses 35 that cooperate with the cylinder bores 24 and pistons 26 to define the engine combustion chambers. Intake valves 36 are slidably supported in the cylinder head 34 and cooperate with intake passages 37 formed in the cylinder head 34 and by an intake manifold 38 for delivering a fuel air charge to the combustion chambers 35. It should be noted that the manifold 38 has a generally arcuate configuration with individual runners 37 for each of the combustion chambers 35 and/or intake valves 36. The manifold 38 curves arcuately forwardly and terminates in a throttle body 39 in which individual throttle valves 41 are positioned for controlling the flow through the manifold passages 37. An inlet trumpet 42 is affixed to each of the throttle bodies 39 and extends into a transversely extending plenum chamber 43 that is positioned forwardly of the engine and which extends transversely across the engine compartment 12. An air inlet and filter element 44 is positioned at one end of the plenum chamber 43 for delivery of filtered fresh air to the plenum chamber 43.

It should h=noted that the arcuate configuration of the induction system permits it to be very compact and still fall well below the hood line 13. To this end, the cylinder block 24 is canted rearwardly so that the cylinder bores 25 are inclined rearwardly from a vertically extending plane and lie over the axle shafts 18. This permits a very compact arrangement as well as a low hood line 13 without sacrificing serviceability or operation of the engine.

Fuel injectors 45 are supported in the cylinder head 34 and discharge fuel supplied from a fuel rail 46 into the cylinder head intake passages 37 in proximity to the intake valves 36. The fuel injection system is controlled by any suitable arrangement.

An intake camshaft 47 is supported within the cylinder head 34 in an appropriate manner and operates the intake valves 36. The intake camshaft 47 is driven in a manner to be described.

In order to improve induction efficiency, each of the manifold runners 37 is in communication with the others through a transversely extending connecter passage 48.

Exhaust valves 49 are supported in the cylinder head 34 in a known manner so as to control the flow of exhaust gases from the combustion chambers 35 into cylinder head exhaust passages 51. The exhaust passages 51 cooperate with an exhaust manifold 52 and exhaust system (not shown) for discharging the exhaust gases from the engine 21 to the atmosphere and for silencing these discharged exhaust gases. The exhaust valves 49 are operated by means of an exhaust camshaft 53 that is journaled within the cylinder head 34 and driven in a manner to be described.

With conventional engines, it is the practice to drive the camshafts 47 and 53 from a camshaft drive arrangement located at one end of the crankshaft 28. The disadvantage with such an arrangement is that it adds to the overall length of the engine. This is not particularly desirable in connection with transverse engine placement of the type herein described. Therefore, in order to reduce the overall length of the engine 21 while still maintaining a generally simple construction, one of the cheeks of one of the throws of the crankshaft 28 is generally continuous and cylindrical and is provided with an external gear 54. This gear 54 is preferably formed on one of the throws inwardly from one end of the crankshaft 28. In accordance with the illustrated embodiment, one cheek of the throw associated with the number two cylinder is formed with the gear 54. A flywheel 55 is affixed to the opposite end of the crankshaft 28 in a conventional manner.

Figure 5:
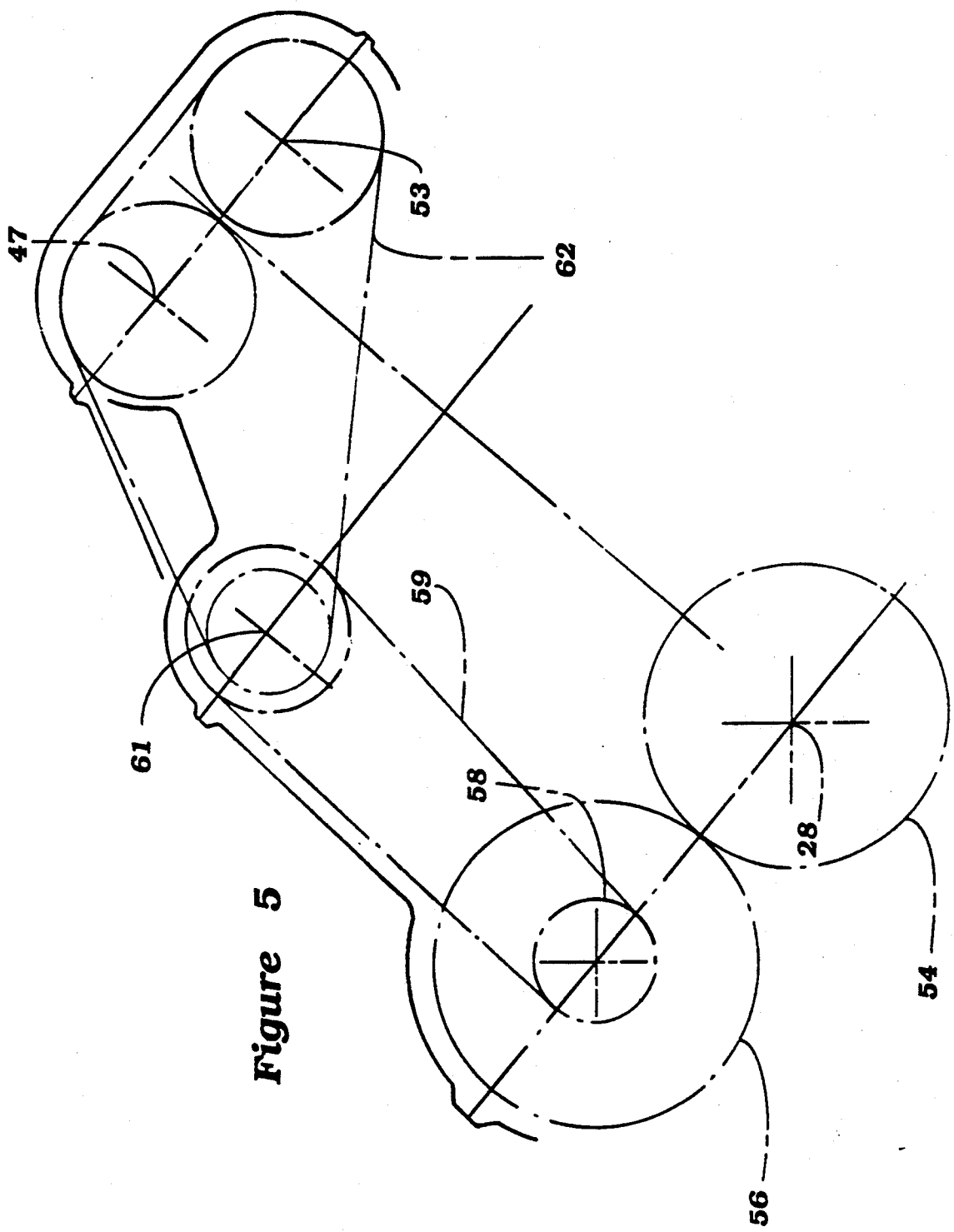
FIG. 5 is a partially schematic side elevational view showing the camshaft driving arrangement.

The gear 54 meshes with a further gear 56 that is supported for rotation about an axis that is parallel to the axis of rotation of the crankshaft 28 but which is offset forwardly of it. This relationship may be best seen in FIG. 5 although it also appears in FIG. 3. The gear 56 is formed integrally with an auxiliary quill shaft 57 on which is formed a driving sprocket 58. A chain 59 transfers drive from the sprocket 58 to a cam driving shaft 61 that is journaled appropriately in the interface between the cylinder block 24 and cylinder head 34. A further chain 62 drives the camshafts 47 and 53 from the camshaft driving shaft 61. If desired, an appropriate tensioner may be provided for the chains 59 and 62.

As is well known, the camshafts 47 and 53 are normally driven at one half crankshaft speed. Usually this is accomplished by means of a 2:1 gear or sprocket reduction between the crankshaft and the camshafts. Such large reductions in a single drive tend to cause the gears and/or sprockets to be unduly large. In accordance with this invention, a portion of the gear reduction occurs between the gears 54 and 56 and the remainder of the reduction occurs between the sprocket on the camshaft driving shaft 61 and the camshafts 47 and 53. In a preferred embodiment of the invention, the ratio between the gears 54 and 56 is approximately 0.8:1.0 and that between the sprocket on the camshaft driving shaft 61 and the sprockets on the camshafts 47 and 53 is approximately 0.62:1.0 so that the two ratios combined gives the desired 0.5 speed reduction.

A further sprocket 63 is formed on the auxiliary quill shaft 57 and is connected by means of a silent chain (not shown) to the starter gear of a starter motor (not shown) which starter motor is mounted on the crankcase 29 and which has its starter gear located therein.

A further auxiliary shaft 64 is journaled within the auxiliary quill shaft 57 and is coupled to this quill shaft by means of a torsional damper 65 that includes coil compression springs. The torsional damper 65 couples the quill shaft 57 to the auxiliary shaft 64 in such a manner so that the camshaft drive will constantly be at the same angular relationship to the crankshaft 28. However, torsional fluctuations in the crankshaft 28 due to its operation will not be transmitted to the auxiliary shaft 64 because of the damper 65.

The transmission 23 is driven by the auxiliary shaft 64 through a selectively engageable friction clutch 66. In this embodiment, the clutch 66 is being depicted as being of the multiple plate type. Of course, the invention can also be utilized in conjunction with single plate clutches. Alternatively, the invention also can be practiced in conjunction with automatic transmissions rather than manual change speed transmissions and clutches 66 of the type now to be described.

The clutch 66 couples the shaft 64 to a primary input shaft 67 of the transmission 22. The primary shaft 67 is coupled to a secondary shaft 68 by means of a plurality of selectively engageable gears (not shown). As is well known with this type of transmission, there are a plurality of gear sets on the transmission primary and secondary shafts 67 and 68 and these gears may be selectively coupled for rotation with their shafts so as to provide the desired speed ratio between the shafts 67 and 68. In addition, a lay shaft (not shown) may carry a reverse gear (also not shown) for effecting reverse rotation of the shaft 68 relative to the shaft 67.

A pulley is affixed to one end of the secondary shaft 68 and drives a silent chain 69 which, in turn, provides the input to the differential 23 for driving the differential and axle shafts 18. This entire mechanism is contained within the crankcase 29 and the transmission cases. Since the detailed construction of the differential 23 forms no part of the invention, it need not be described in further detail.

A generator or alternator 71 is driven off one end of the auxiliary shaft 64 by means of a belt. The generator or alternator 71 is nested between the transmission 23 and cylinder block 24 and lies at least in part below the intake manifold 38 so as to provide a compact and yet serviceable arrangement.

Figure 6:
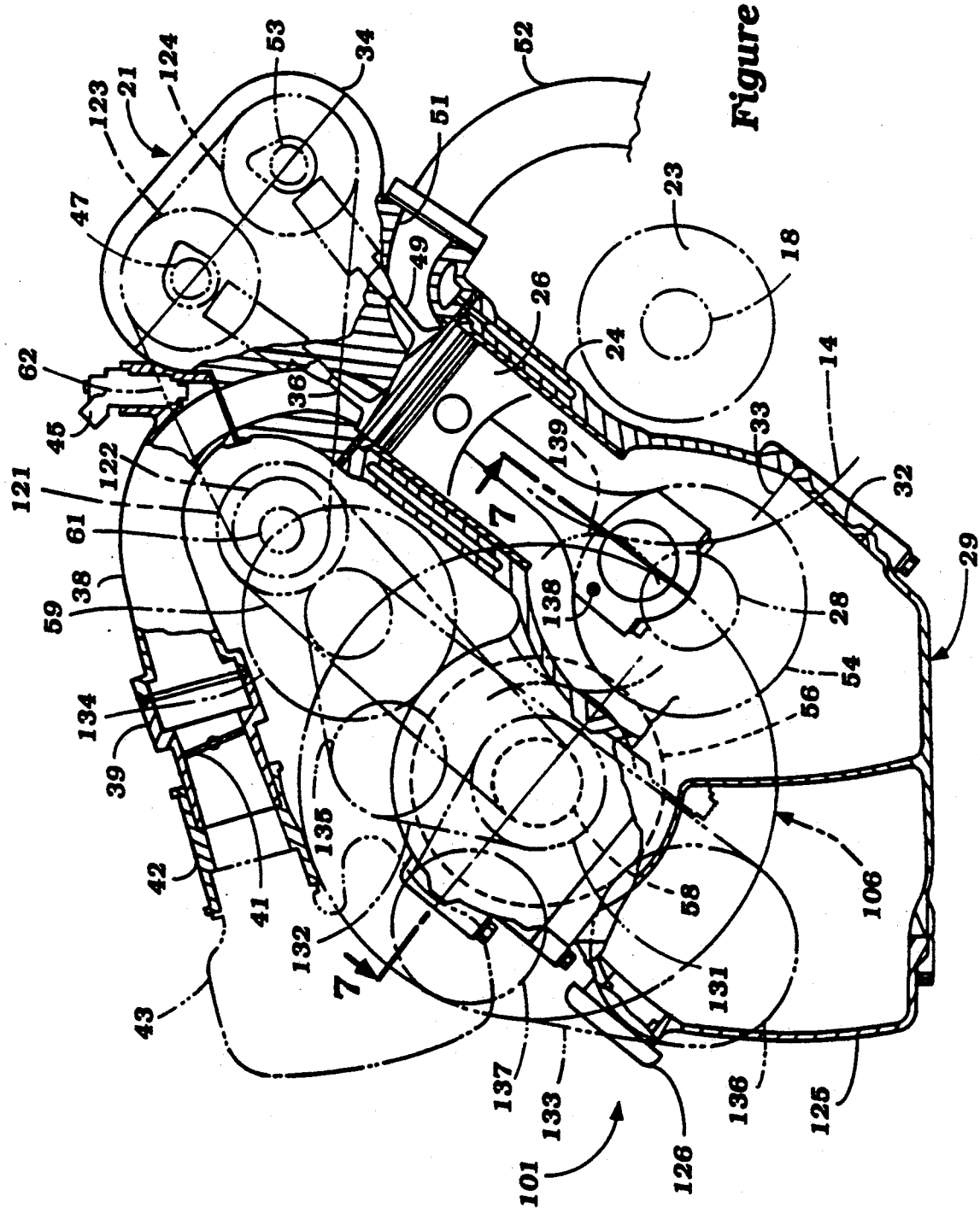
FIG. 6 is a side elevational view, with portions broken away, of an power unit, in part similar to FIG. 3, showing another embodiment of the invention.
Figure 7:
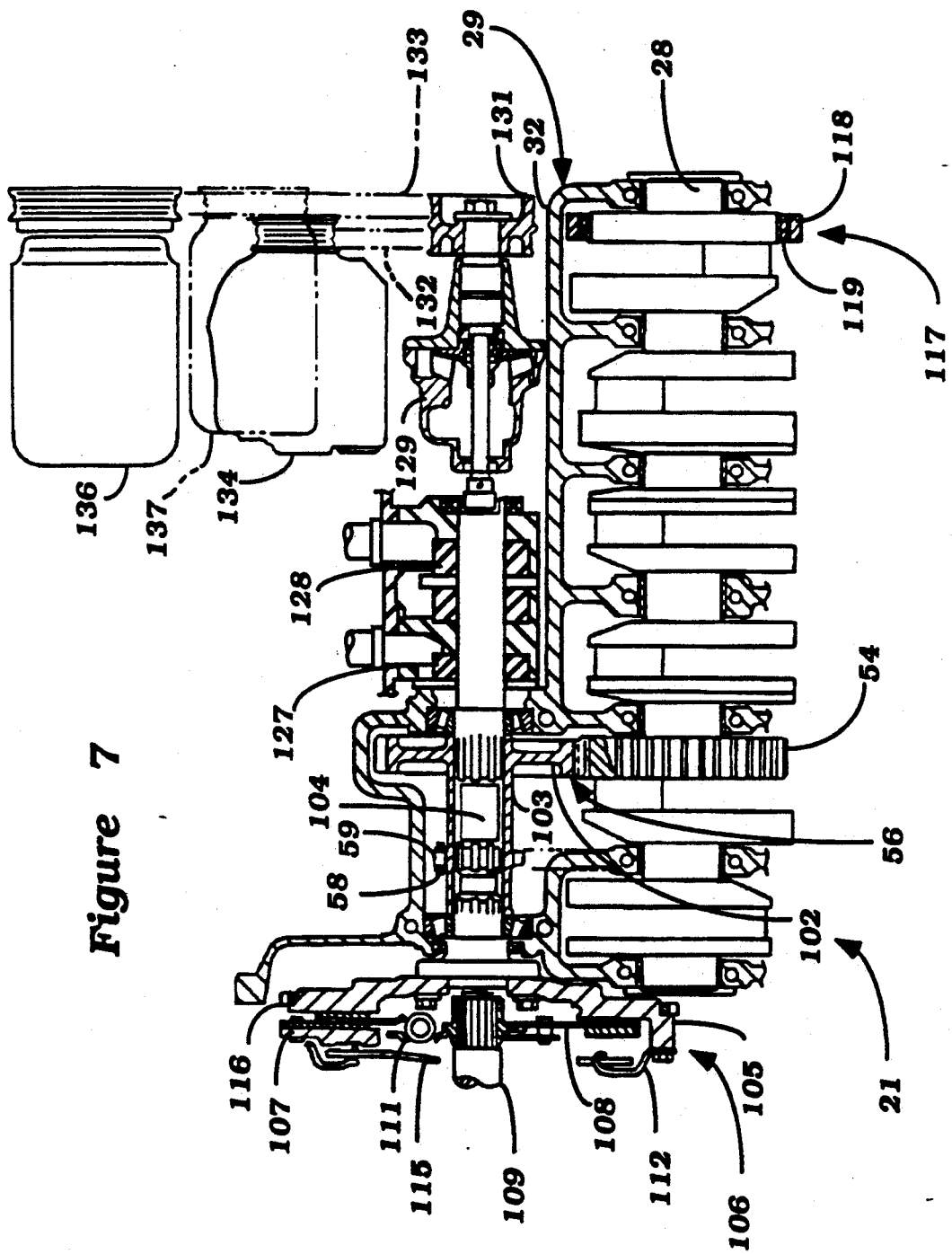
FIG. 7 is an enlarged cross-sectional view taken along the line 7—7 of FIG. 6.

A power unit adapted for utilization in a vehicle of the configuration shown in FIGS. 1 and 2 and constructed in accordance with another embodiment of the invention is illustrated in FIGS. 6 and 7 and is identified generally by the reference numeral 101. In many regards, the power unit 101 is similar to the power unit 19 of the embodiment of FIGS. 1 through 5. For that reason, those components which are the same as the components of the previously described embodiment have been identified by the same reference numerals and will not be described again in detail, except insofar as may be necessary to understand the construction and operation of this embodiment.

In this embodiment, the auxiliary shaft-camshaft drive gear 54 that is formed integrally with one of the cheeks of the crankshaft throws also meshes with the gear 56 which, in this embodiment, is connected by a hub portion 102 to a quill shaft 103. The quill shaft 103 is formed with an integral sprocket portion 58 for driving the timing chain 59 which, in turn, drives the camshaft drive shaft 61 in the manner of the previously described embodiment. Furthermore, in this embodiment there is provided an auxiliary shaft 104 that has a splined connection to the quill shaft 103 and which drives a flywheel 105 which forms a part of a clutch assembly, indicated generally by the reference numeral 106. The clutch assembly 106 is, unlike that of the previously described embodiment, of the single plate type and includes a pressure plate 107 that is adapted to cooperate with a driven disk 108 for driving the input shaft 109 of the transmission 22. There is provided a torsional damper 111 between the driven clutch disk 108 and the shaft 109 for absorbing torsional vibrations. A clutch cover 112 encloses the clutch mechanism and supports clutch actuating fingers 113 for selectively disengaging the clutch 106 in a known manner.

In this embodiment, a starter ring gear 116 is either affixed to or formed integrally with the flywheel 105 and cooperates with a starter motor (not shown) for starting of the engine 21. Thus, the chain drive, starter mechanism of the previously described embodiment is not employed in conjunction with this embodiment.

In this embodiment, a torsional vibration damper, indicated generally by the reference numeral 117, is affixed to one cheek of the end throw of the crankshaft 28, which cheek is formed in a cylindrical configuration like that which forms the gear 54. The torsional vibration damper 117 includes an annular inertial ring 118 that is connected to the crankshaft cheek by an elastomeric ring 119 so as to provide a torsional vibration damper within the crankcase 29.

In this embodiment, it should be noted that the drive sprockets between the auxiliary shaft 58 and the cam driving shaft 61 and the camshafts 47 and 53 are illustrated. Referring to FIG. 6, it will be seen that the chain 59 drives a first sprocket 121 that is affixed to the cam driving shaft 61. A second sprocket 122 is also affixed to the shaft 61 and drives the chain 62.

Affixed to the intake and exhaust cams 47 and 53 respectively are driven sprockets 123 and 124 so as to establish the previously described driving relationship. The ratios of the various sprockets in this gear reduction are as aforedescribed so as to provide the desired 2:1 ratio between the rotation of the crankshaft 28 and the camshafts 47 and 53.

In this embodiment, the crankcase 29 is of the dry sump type. Therefore, there is provided an external oil reservoir 125 that is disposed to one side of the crankcase 29 and which has a fill cap 126. The dry sump lubrication system also includes a scavenge pump 127 (FIG. 7) and a pressure pump 128 that are driven by the shaft 104. Suitable plumbing connections interconnect the scavenge pump 127 with the crankcase 29 for drawing lubricant therefrom and delivering it to the external dry sump tank 125. The pump 128 draws oil from the tank 126 and delivers it to the lubrication system of the engine 21 in any known manner.

A water pump 129 for the engine cooling system is also driven from the shaft 104. The water pump 129 has affixed to it a drive pulley 131 that drives a first accessory drive belt 132 and a second accessory drive belt 133. The accessory drive belt 132 drives an alternator 134 and there is provided an idler pulley 135 in this drive.

The accessory drive belt 133 drives an air conditioning compressor 136 and a power steering pump 137. As will be noted from FIG. 6, the layout of these driven accessories is such so as to provide a very compact relationship and yet one which offers good servicing for the components.

In the embodiment of FIGS. 6 and 7, the drive gear 54 was positioned adjacent one end of the crankshaft 28 while the torsional vibration damper 117 was positioned adjacent the other end of the crankshaft 28.

In this embodiment, the transmission secondary shaft rotates about an axis 138 that is disposed almost adjacent to the axis of rotation of the crankshaft 28 and thus is even more compact than the previously described embodiment. Also, in this embodiment, the transmission secondary shaft 138 drives a gear 139 that is enmeshed with a gear 141 which drives the differential assembly and thus the chain drive of the previously described embodiment is deleted. This is possible because of the more compact relationship as aforenoted.

FIG. 8 shows another embodiment of the invention, wherein the camshaft drive gear 54 is positioned generally centrally of the crankshaft 28. In this embodiment, there are provided torsional vibration dampers 151 at each end of the crankshaft 28. These torsional vibration dampers 151 are contained within the crankcase 29 and each include annular inertial rings 152 that are affixed to cylindrical sections of the crankshaft throws by means of annular elastomeric rings 153. As a result, even greater torsional damping is possible within a small confine.

It should be readily apparent that a number of embodiments of the invention have been illustrated and described, each of which provides a very compact power unit for a vehicle and which nevertheless achieves good serviceability. Although a number of embodiments of the invention have been illustrated and described, various changes and modifications may be made without departing from the spirit and scope of the invention, as defined by the appended claims.

We claim:

1. In a motor vehicle having a driven wheel rotating about a first axis that extends generally transversely to the vehicle, an engine supported within said vehicle, with its output shaft rotating about a second axis that extends generally parallel to said first axis, said first axis being disposed on one side of said second axis, the improvement comprising a transmission having a primary shaft rotatable about a third axis generally parallel to said second axis and on the other side thereof from said first axis, means for driving said transmission primary shaft from said engine output shaft, and means including said transmission for driving said wheel from said primary shaft.

2. In a motor vehicle as set forth in claim 1 wherein the transmission comprises a change speed transmission having a secondary shaft and a plurality of intermeshing gear sets on said primary shaft and said secondary shaft for driving said secondary shaft at selected speed ratios from said primary shaft.

3. In a motor vehicle as set forth in claim 2 wherein the means for driving the wheel comprises a chain for driving the wheel from the transmission secondary shaft.

4. In a motor vehicle as set forth in claim 2 wherein the means for driving the wheel includes an output gear on the transmission secondary shaft in addition to the intermeshing gear sets for driving the wheel.

5. In a motor vehicle as set forth in claim 2 wherein the transmission secondary shaft is also located on the other side of the engine from the first axis.

6. In a motor vehicle as set forth in claim 5 wherein the means for driving the wheel comprises a chain for driving the wheel from the transmission secondary shaft.

7. In a motor vehicle as set forth in claim 5 wherein the means for driving the wheel includes an output gear on the transmission secondary shaft in addition to the intermeshing gear sets for driving the wheel.

8. In a motor vehicle as set forth in claim 1 wherein the engine has a plurality of in-line cylinders, said cylinders being inclined from the vertical.

9. In a motor vehicle as set forth in claim 8 wherein the cylinders overlie the first axis.

10. In a motor vehicle as set forth in claim 8 wherein the engine is located at the front of the vehicle and the cylinders are inclined rearwardly so that the crankshaft axis lies ahead of the cylinders.

11. In a motor vehicle as set forth in claim 10 wherein the crankshaft is rotatably journaled within a crankcase defined by a lower portion of the cylinder block and a crankcase pan, the mating faces between the cylinder block and the crankcase pan lying on a plane substantially perpendicular to the axis of the cylinders.

12. In a motor vehicle as set forth in claim 11 further including forwardly facing intake ports formed on the cylinder block and an intake manifold affixed thereto and being curved downwardly and lying at least in part above said cylinder block and having an inlet end positioned forwardly thereof.

13. In a motor vehicle as set forth in claim 2 wherein the transmission secondary shaft is rotatable about a fourth axis parallel to the third axis and offset from the second axis at a distance less than the distance between the third axis and the second axis.

14. In a motor vehicle as set forth in claim 13 wherein the third axis and the fourth axis lie on the opposite side of the second axis from the first axis.

15. In a motor vehicle as set forth in claim 14 wherein the engine has a plurality of in-line cylinders inclined from the vertical and lying over the first axis.

16. In a motor vehicle as set forth in claim 15 further including an auxiliary shaft rotatable about a sixth axis offset from the second axis and for operating a component of the engine, means for directly driving said component from said auxiliary shaft and torsional resilient coupling means for driving said transmission primary shaft from said auxiliary shaft.

17. In a motor vehicle as set forth in claim 16 wherein the auxiliary shaft is driven from the engine output shaft by means of gearing located between the ends of the engine output shaft and further including torsional vibration damper affixed for rotation to one end of said engine output shaft.

18. In a motor vehicle as set forth in claim 17 wherein the engine output shaft comprises a crankshaft and the means for driving the auxiliary shaft includes a spur gear affixed to one of the cheeks of one of the throws of the crankshaft.

19. In an internal combustion engine transmission assembly comprised of an output shaft powered by said engine and rotating about a first axis, a transmission primary shaft rotatable about a second axis parallel to said first axis and offset therefrom a first distance, a transmission secondary shaft rotatable about a third axis parallel to said first axis and offset therefrom a second distance, means for driving said transmission primary shaft from said engine output shaft, and means including change speed gearing for driving said transmission secondary shaft from said transmission primary shaft at selected speed ratios, the improvement comprising said second distance being less than said first distance, a wheel associated with an axle driven by the transmission secondary shaft, said axle being disposed on the opposite side of said engine output shaft from said transmission primary and secondary shafts.

20. In an internal combustion engine transmission assembly as set forth in claim 19 wherein there are a pair of axles disposed in generally aligned relationship each driven by the transmission secondary shaft for driving a respective wheel.

21. In an internal combustion engine transmission assembly as set forth in claim 19 wherein the wheels are connected for steering movement to the respective axles.

22. In an internal combustion engine transmission assembly as set forth in claim 21 wherein the engine has a plurality of aligned cylinders inclined from the vertical and overlying the axles.

23. In a motor vehicle as set forth in claim 22 wherein the engine is located at the front of the vehicle and the cylinders are inclined rearwardly so that the crankshaft axis lies ahead of the cylinders.

24. In a motor vehicle as set forth in claim 22 wherein the crankshaft is rotatably journaled within a crankcase defined by a lower portion of the cylinder block and a crankcase pan, the mating faces between the cylinder block and the crankcase pan lying on a plane substantially perpendicular to the axis of the cylinders.

25. In a motor vehicle as set forth in claim 22 further including forwardly facing intake ports formed on the cylinder block and an intake manifold affixed thereto and being curved downwardly and lying at least in part above said cylinder block and having an inlet end positioned forwardly thereof.

26. In an internal combustion engine transmission assembly as set forth in claim 22 further including an auxiliary shaft rotatable about a fourth axis offset from the second axis and for operating a component of the engine, means for directly driving said component from said auxiliary shaft and torsional resilient coupling means for driving said transmission primary shaft from said auxiliary shaft.

27. In an internal combustion engine transmission assembly as set forth in claim 26 wherein the auxiliary shaft is driven from the engine output shaft by means of gearing located between the ends of the engine output shaft and further including a torsional vibration damper affixed for rotation to one end of said engine output shaft.

28. In an internal combustion engine transmission assembly as set forth in claim 27 wherein the engine output shaft comprises a crankshaft and the means for driving the auxiliary shaft includes a spur gear affixed to one of the cheeks of one of the throws of the crankshaft.

29. In an internal combustion engine comprising a crankshaft driven by said engine and rotatable about a first axis, a power shaft, an auxiliary shaft rotatable about a second axis offset from said first axis for operating a component of said engine, a transfer shaft rotatable about a third axis, means for directly driving said transfer shaft directly from said crankshaft, and means for directly driving said auxiliary shaft from said transfer shaft, the improvement comprising torsionally resilient coupling means for driving said power takeoff shaft from said transfer shaft.

30. In an internal combustion engine as set forth in claim 29 wherein the crankshaft has a plurality of throws and the means for driving the transfer shaft directly from the crankshaft comprises gearing means formed on the crankshaft between its ends.

31. In an internal combustion engine as set forth in claim 30 wherein the gearing means comprises a gear formed on one of the cheeks of one of the throws of the crankshaft.

32. In an internal combustion engine as set forth in claim 29 wherein the auxiliary shaft drives the camshafts of the engine.

33. In an internal combustion engine as set forth in claim 32 wherein the auxiliary shaft is driven at a speed ratio from the engine crankshaft other than unity and the camshafts are driven from the auxiliary shaft at a speed ratio other that unity and wherein the speed ratio between the camshafts and the crankshaft is 0.5:1.0.

34. In an internal combustion engine as set forth in claim 33 wherein the auxiliary shaft is driven from the engine output shaft by means of gearing located between the ends of the engine output shaft and further including a torsional vibration damper affixed for rotation to one end of said engine output shaft.

35. In an internal combustion engine as set forth in claim 34 wherein the engine output shaft comprises a crankshaft and the means for driving the auxiliary shaft includes a spur gear affixed to one of the cheeks of one of the throws of the crankshaft.

36. In an internal combustion engine comprising a crankshaft driven by said engine and rotating about an axis, an output shaft rotatable about an axis parallel to and offset from said crankshaft axis, drive means intermediate the ends of said crankshaft for driving said output shaft from said crankshaft, and a flywheel fixed for rotation at one end of said output shaft, the improvement comprising a torsional vibration damper affixed for rotation directly to one end of said crankshaft.

37. In an internal combustion engine as set forth in claim 36 wherein torsional vibration dampers are affixed to the opposite ends of the crankshaft.

38. In an internal combustion engine as set forth in claim 37 wherein the drive means for driving the output shaft includes a spur gear affixed to one of the cheeks of one of the throws of the crankshaft.

39. In an internal combustion engine comprising a crankshaft driven by said engine and having a plurality of throws defined by facing pairs of cheeks, at least one of said cheeks being formed as a generally cylindrical surface and carrying external gear teeth thereon, an auxiliary shaft having a gear fixed thereon and enmeshed with the gear carried by said crankshaft for driving said auxiliary shaft from said crankshaft.

40. In an internal combustion engine as set forth in claim 39 wherein the auxiliary shaft comprises means for driving the camshafts of the engine.

* * * * *